United States Patent [19]
Crapo, III et al.

[11] Patent Number: 5,191,186
[45] Date of Patent: Mar. 2, 1993

[54] NARROW BEAM ARC SPRAY DEVICE AND METHOD

[75] Inventors: Harold B. Crapo, III, Pembroke; Brian J. Blades, Concord; William R. Kratochvil, Laconia, all of N.H.

[73] Assignee: Tafa, Incorporated, Concord, N.H.

[21] Appl. No.: 731,813

[22] Filed: Jul. 17, 1991

Related U.S. Application Data

[63] Continuation-in-part of Ser. No. 542,330, Jun. 22, 1990, abandoned.

[51] Int. Cl.⁵ .............................................. B23K 9/04
[52] U.S. Cl. .................... 219/76.16; 219/121.55; 219/121.47; 219/121.51; 427/449
[58] Field of Search ............... 219/76.15, 76.14, 76.16, 219/75, 121.47, 121.52, 121.53; 427/34

[56] References Cited
U.S. PATENT DOCUMENTS

| | | | |
|---|---|---|---|
| 4,095,081 | 6/1978 | Ashman | 219/76.16 |
| 4,370,538 | 1/1983 | Browning | 219/76.16 |
| 4,627,990 | 12/1986 | Saga et al. | 219/76.16 |
| 4,668,852 | 5/1987 | Fox et al. | 219/76.16 |
| 4,992,337 | 2/1991 | Kaiser et al. | 219/76.16 |
| 5,043,548 | 8/1991 | Whitney et al. | 219/121.48 |

*Primary Examiner*—Mark H. Paschall
*Attorney, Agent, or Firm*—Renner, Otto, Boisselle & Sklar

[57] ABSTRACT

A narrow beam arc spray head device includes a convergent-divergent nozzle; a number of wires the paths of which intersect at a point in the nozzle; controller for supplying an electrical current to the wires so that an arc is formed between the wires causing a portion of at least one of the wires to melt; a primary axial gas stream impinging upon the wire path intersection to cause the molten metal to be carried axially away from the area of the intersection; and a secondary gas stream forming a generally conical sheath around the axial gas stream in the divergent portion of the nozzle; whereby the primary gas stream and the secondary gas stream emerge from the nozzle as substantially coaxial gas streams thus tending to concentrate the flow of the molten metal carried by the coaxial streams. The spray head device may also include a regulator for regulating the secondary gas stream relative to the primary axial gas stream.

13 Claims, 3 Drawing Sheets

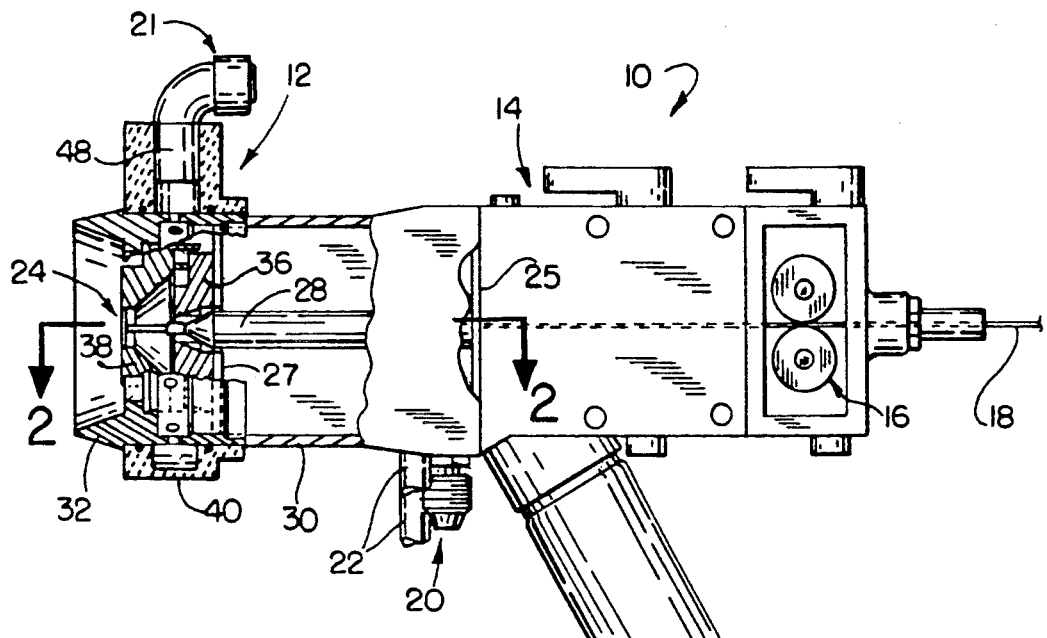
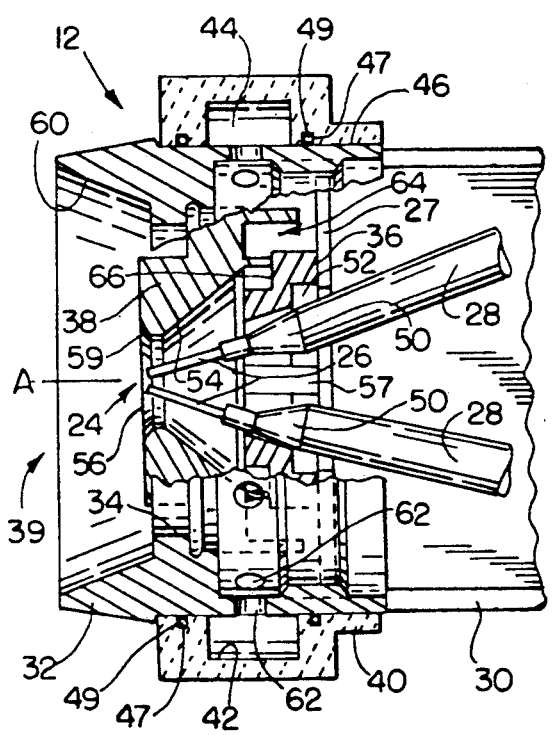
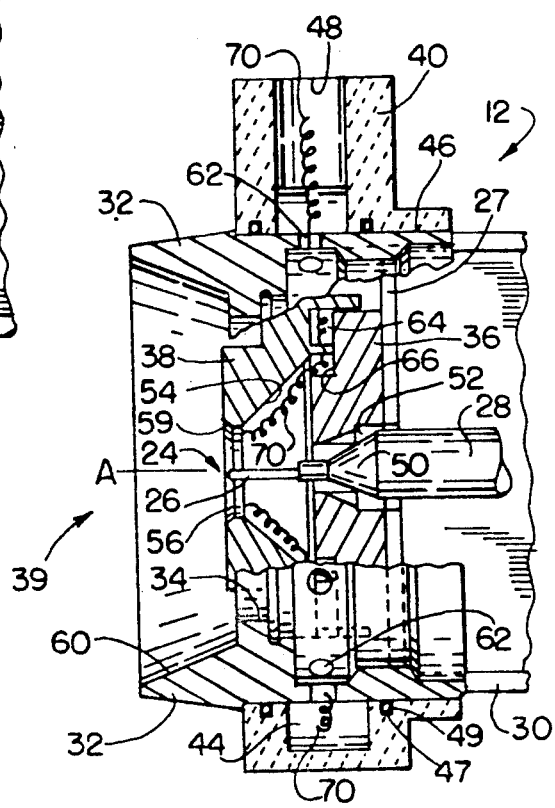

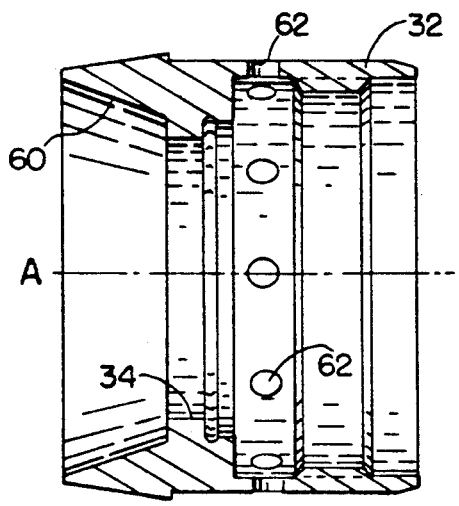
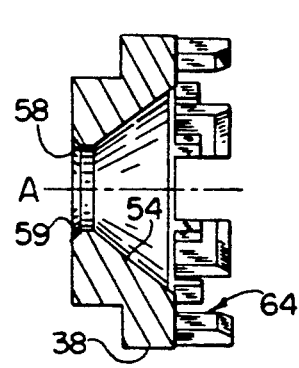
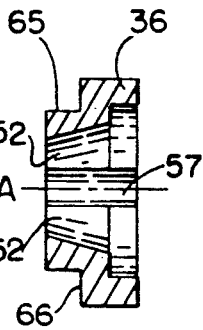
FIG. 6    FIG. 5    FIG. 4
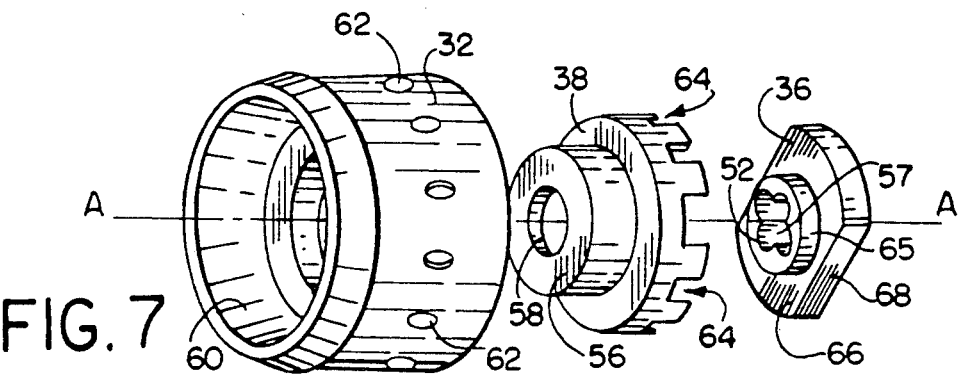
FIG. 7
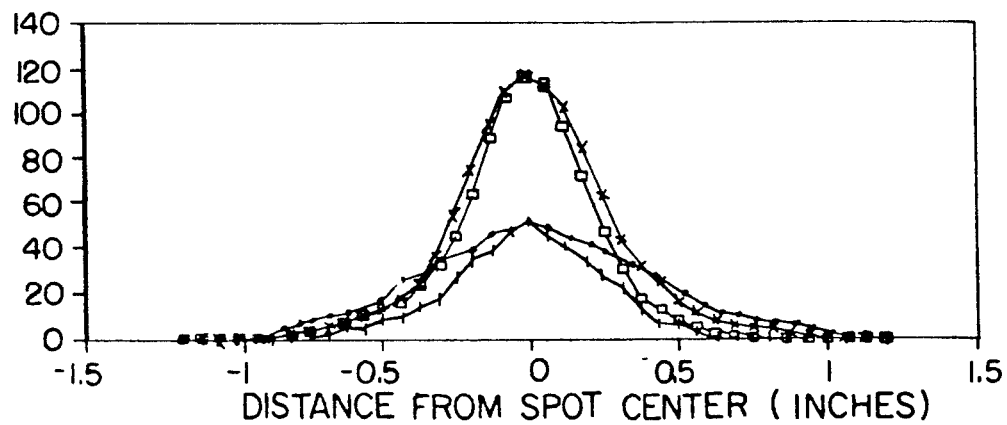
FIG. 9

NARROW BEAM ARC SPRAY DEVICE AND METHOD

RELATED APPLICATION

This application is a continuation-in-part of U.S. patent application Ser. No. 07/542,330, filed Jun. 22, 1990 now abandoned, entitled NARROW BEAM ARC SPRAY HEAD DEVICE, the disclosure of which is incorporated by this reference.

TECHNICAL FIELD

This invention relates generally to arc spray devices, and, more particularly, to an arc spray gun providing a concentrated pattern of high velocity, small particulate, molten metal to form a metal coating on the desired surface of an object.

BACKGROUND

Arc spray guns are well known in the art. In a conventional arc spray gun, an electric arc is utilized to melt a metallic material so that the molten metal may be sprayed onto a surface, such as a steel plate or other object, in order to form a desirable coating on the surface. Typically, two metal wires serve as consumable electrodes between which the electric arc is established. Simultaneously, compressed gas is injected into the arc zone region behind the metal wires. The compressed gas atomizes the molten metal created by the arc and propels the metal particulate onto the surface.

In a conventional arc spray gun, two metal wires are guided through the gun along respective paths. The wires exit the gun at a location often referred to as the arc spray head. The arc spray head includes the gun structure where the wires exit the gun and also may include the space near the actual gun sturcture. At the arc spray head the path of the two wires converge and intersect. An electrical potential difference established across the two wires causes an electric arc to occur between the wires at the area at which the wire paths intersect. The heat generated by the arc melts the ends of the two wires, and a gas nozzle positioned at the arc spray head directly behind the intersection of the wire path directs a stream of high velocity gas which impinges upon and atomizes the molten metal. The gas stream then carries the atomized metal particles, or droplets, away from the arc zone and propels them towards the surface to be coated.

Some arc spray guns have utilized a secondary gas stream to divert the atomized metal spray a certain angle in order to direct the spray into a small or confined area. Other guns have employed a secondary gas stream interacting with the primary stream to provide somewhat controlled atomization and flow of the spray at least within the area of the arc spray head. An example of the latter type of an electric arc spray gun is described in U.S. Pat. No. 4,492,337 the disclosure of which is incorporated by this reference.

While conventional electric arc spray devices provide an effective way of coating a surface, they tend to be somewhat inefficient in that a substantial quantity of the material consumed is not deposited on the intended surface. Often 40% or more of the material is lost through overspray and dust formation. Also, due to an inability to accurately concentrate and direct the spray of molten metal droplets, it has been difficult to achieve a uniform thickness of the coating in all areas of the coated surface. Consequently, it was necessary to use a large excess of coating material to ensure that all areas of the surface had an adequately thick coating to premit further finishing operations. Even when a relatively uniform thickness of coating could be created, the surface tended to be rather coarse, again requiring extensive finishing. These problems further exacerbated the inefficiency by requiring that a substantial amount of deposited coating material be machined away to provide a surface with the requisite dimensional tolerances and finish.

A further problem with conventional arc spray guns has been that they are not versatile and do not provide effective means for adjusting flow rate, particulate size, and deposit patterns to best satisfy a particular application.

It would be desirable to provide a versatile electric arc spray device that produced a concentrated and well directed pattern of molten metal droplets, and a coating with finer surface finish.

SUMMARY OF THE INVENTION

The arc spray head device of the present invention provides a separately controlled, high flow rate, secondary air supply which assists in the acceleration and collimation of the particulate spray stream, thus resulting in a more concentrated deposit pattern of higher velocity droplets. The increase in the droplet velocity tends to cause the formation of smaller droplets which create a much finer surface coating, while the concentrated droplet pattern improves the uniformity of coating thickness and increases the percentage of material actually forming the coating versus material lost due to overspray and dust formation. Consequently, less material need be machined away.

In accordance with one aspect of the present invention, a narrow beam arc spray head device includes a convergent-divergent nozzle; a number of wires the paths of which intersect at a point in the nozzle; means for supplying an electrical current to the wires so that an arc is formed between the wires causing a portion of at least one of the wires to melt; a primary axial gas stream impinging upon the wire path intersection to cause the molten metal to be carried axially away from the area of the intersection; and a secondary gas stream forming a conical sheath around the axial gas stream in the divergent portion of the nozzle; whereby the primary gas stream and the secondary gas stream emerge from the nozzle as coaxial gas streams thus tending to concentrate the flow of the molten metal carried by the coaxial streams.

According to another aspect, an arc spray gun includes a nozzle having a divergent section; means for forming an arc within the nozzle for melting material intended to be sprayed on a surface; first propellant means for propelling the molten material through the nozzle in an axial direction; and second propellant means for forming a sheath around the molten material coaxial with the axial direction substantially the complete distance to the surface to be coated.

According to a further aspect of the present invention, a method of coating a surface with a material includes the steps of melting the material in a nozzle; propelling the molten material through such nozzle in an axial direction; and, forming a gas sheath around the propelled molten material that is coaxial with the axial direction of the propelled molten material substantially the complete distance to the surface.

According to still another aspect, an arc spray gun includes a nozzle for forming an arc within the nozzle for melting a material intended to be sprayed on a surface; a first propellant for propelling the molten material through the nozzle in an axial direction; a second propellant for forming a sheath around the molten material coaxial with the axial direction substantially the complete distance to the surface; and a regulator for regulating the second propellant relative to the first propellant; wherein the first and second propellants are supplied from a common source.

These and other objects, advantages, features and aspects of the present invention will become apparent as the following description proceeds.

To the accomplishments of the foregoing and related ends, the invention, then, comprises the features hereinafter fully described in the specification and particularly pointed out in claims, the following description and the annexed drawings setting forth in detail a certain illustrative embodiment of the invention, this being indicative, however, of but one of the various ways in which the principals of the invention may be employed. It will be appreciated that the scope of the invention is to be determined by the claims and the equivalents thereof.

BRIEF DESCRIPTION OF THE DRAWINGS

In the annexed drawings:

FIG. 1 is a cutaway view of an electric arc spray gun employing the narrow beam arc spray head device of the present invention;

FIG. 2 is a top cross-sectional view of the narrow beam arc spray head device taken along the cut 2—2 in FIG. 1;

FIG. 3 is a side view of the spray head device;

FIG. 4 is a cross-sectional view of the nozzle positioner of the narrow beam spray head device;

FIG. 5 is a cross-sectional view of the air cap of the spray head device;

FIG. 6 is a cross-sectional view of the arc nut of the spray head device;

FIG. 7 is an exploded isometric view of the arc nut, air cap, and short nozzle of the present invention;

FIG. 9 is a graphical representation of the spray distribution for a standard electric arc spray head versus the narrow beam arc spray head of the present invention.

DETAILED DESCRIPTION OF THE PREFERRED EMBODIMENT

Figure 8:
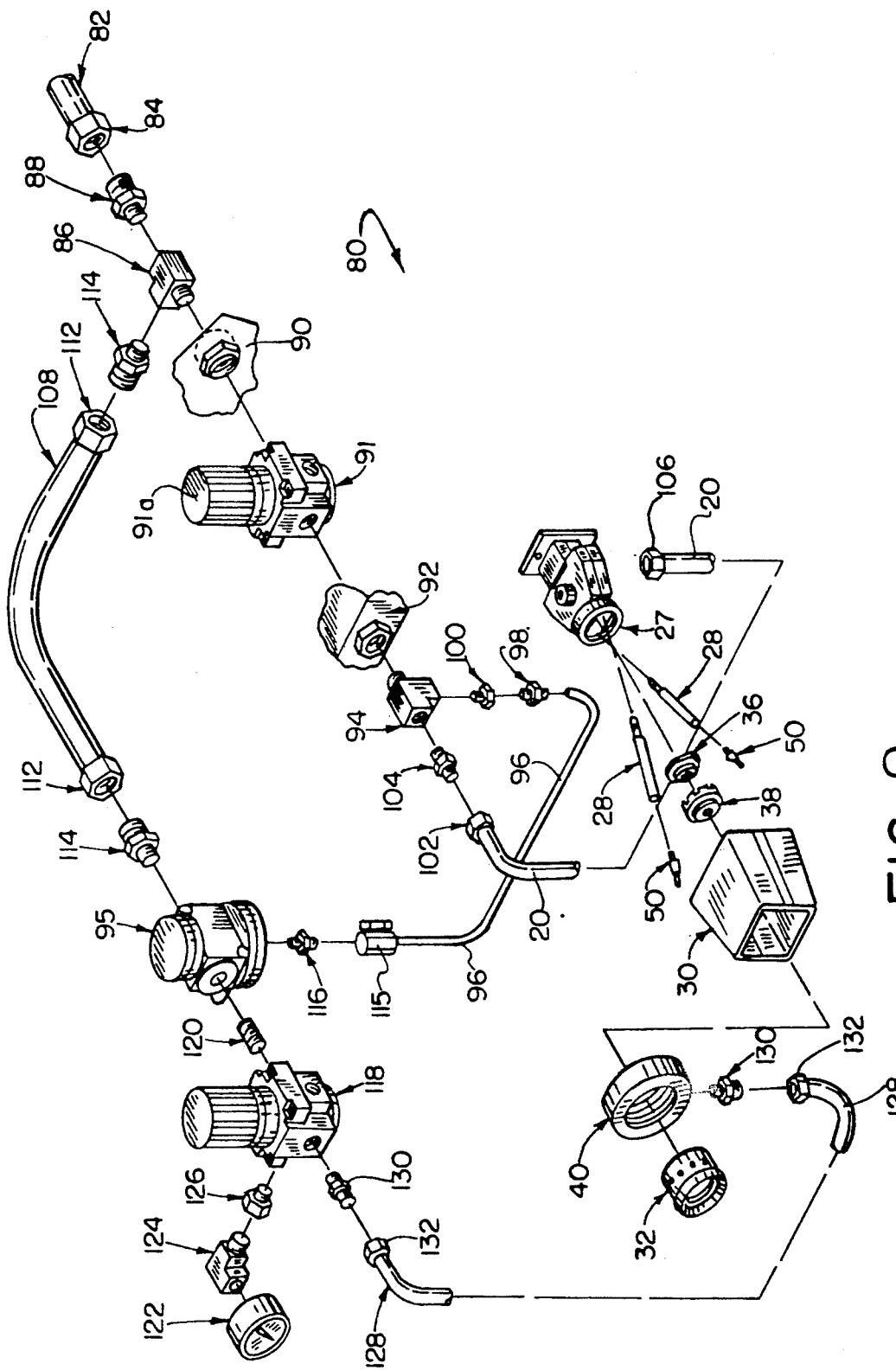
FIG. 8 is an exploded view of the spray head device and related pneumatic circuitry.

With reference now to the several figures in which like reference numerals depict like items, and initially to FIG. 1, there is shown an electric arc spray gun 10 equipped with a narrow beam arc spray head 12 in accordance with the present invention. The arc spray gun 10 produces a controlled dispersion in the form of an atomized metal spray stream, the spreading or dispersing of which is controlled. The atomized metal spray stream tends to have significantly higher particle velocities than that produced by conventional guns and as a result produces a denser, i.e., better, coating.

The spray gun 10 is generally assembled as is conventional, and typically would include a gun housing 14 which secures the spray head 12, a wire feed assembly 16 for continuously feeding the wires 18 to be consumed to form the spray coating to the spray head, suitable ducts and connections 20 and 21 for attachment to a source of compressed air, and electrical connections 22 for the supply of electrical power such as to create the arc between the wires 18. The wire feed assembly 16 located at one end of the housing 14 functions to feed metal wires 18 at a constant rate or controlled variable rate through the housing 14 towards the arc spray head 12, which typically is at or toward the opposite end of the gun housing 14. As the wires 18 are fed or advanced, they are guided along their respective paths which ultimately coverge and intersect at a location near the outside of the structure of the arc spray head 12 in the area commonly referred to as the arc zone 24.

An electric potential difference supplied through the electrical connections 22 across wires 18 causes a current to flow and an arc to be created between the ends 26 of the wires 18 at the area where their paths intersect within the arc zone 24. The arc generates enough heat in the arc zone 24 to cause the ends of the metal wires 18 to melt back a short distance. As the wires continue to be fed or supplied to the arc zone 24, the approaching wire ends will continuously melt off due to the heat generated by the continuing arc. The arc may be viewed as a ball of ionized or superheated gas created by the current which arcs between the wire ends 26 which generates sufficient heat to melt the ends of the wires. As is explained in more detail below, the resultant molten metal is atomized and propelled away from the arc head 12 by the action of a primary axial gas stream. A secondary conical gas stream provides a conical sheath surrounding the primary gas stream. The primary and secondary gas streams thus form coaxial streams which propel the molten metal droplets in an axial direction in a narrow, concentrated stream. The action of the coaxial stream may be visualized as constraining the molten metal droplets within the center stream, thus resulting in a well collimated spray pattern.

In the exemplary embodiment of the invention described in detail herein, portions of the wires that enter the zone at which the arc exists will be melted, for example, due to the heat in that arc zone. Continued feeding of the wires into the arc zone results in continued melting of the fed wires. The coaxial gas streams move molten material out from the arc zone and propel that material downstream, leaving space at the arc zone for subsequently melted material, which may be subsequently moved out from the arc zone by such coaxial gas streams.

The molten material referred to may be truly molten or liquid. Alternatively, the molten material may be solid, but somewhat softened to enable disconnecting thereof from the respective wire to be propelled downstream by the axial gas stream. Still further, the molten material may be plural droplets of liquid. The molten material intended to be sprayed also may be or may include a material that converts from a solid to a gas, i.e., sublimes, such as may be the case for carbide particles. The molten material, still further, may be a material that converts from a liquid to a gas. In either of these latter two cases the term molten material would encompass a gas. The molten material also may include a solid material, such as particles that can be sprayed, especially with such particles being included with some other more liquid material being sprayed by the invention. Even further, the molten material may include various combinations of the foregoing. Regardless, reference to melted or molten material herein is intended to encompass the foregoing and variations and equivalents thereof. It will be appreciated, then, that the term molten material envisioned herein means a material that has sufficient fluid characteristics as to be able to be propelled by the axial gas stream, preferably after such molten material has been heated to a temperature that will enable and/or will facilitate bonding to the surface intended to be coated thereby.

Although the preferred source of the molten material is a pair of wires that are, for example, melted in an electric arc formed therebetween as both wires tend to be melted or otherwise used or consumed, it will be appreciated that other sources of the molten material may be employed in the invention. One example, is the use of one non-consumed electrode and one consumable electrode between which an arc is established to cause melting of the consumable electrode. Another example is an electric arc gun apparatus that may employ more than two electrodes among which the arc is established and in which arc one or more of the electrodes is melted, or otherwise used or consumed. A further example is the introduction of a powdered material into an arc established between electrodes.

In the preferred embodiment the wires 18 are illustrated as solid wires. Exemplary materials are well known in the art of electric arc spraying. However, other types of wires also may be used. One example is cored wire, which is formed of a hollow tube of metal in which a second material, such as a powder, for example, may be contained. Other examples are wires formed of agglomerated material, sintered material, extruded material, and so on. Preferably, though, the wires used should have an electrical conduction characteristic enabling them to participate in the dissipating of energy, e.g., by forming an arc, or otherwise contributing to the mechanism by which molten material is provided in the path of the axial gas stream to be propelled thereby. However, if desired, the sprayed material may be other than an electrical conductor, such as a ceramic, for example; in such case other means may be provided preferably to heat such material, e.g., another source of electric arc. Also, such non-conductor may be combined with a conductor. As used herein, then, metal particles may include those materials that are not metals (or conductors). It will be appreciated that the materials that are sprayed may be of the type that are non-self-bonding or are self-bonding. Materials that react or that do not react during the spray process may be used in the invention. Such materials may or may not actually melt or soften in the spraying process.

It also is contemplated, according to the invention, that a further source of material intended to be sprayed may be employed with the source of material described in detail herein, namely, the electric arc and wire feed thereto. Such further source may be a spray, a jet, a supply, etc., of such further material that effects or allows injecting or other placement of such further material into the stream to be sprayed. For example, such further material may be directed into the arc, into the coaxial gas stream upstream of the arc and/or into the sprayed material relatively downstream of the arc. The further material may or may not actually melt or soften in the spraying process.

As shown in FIGS. 2 and 3, the narrow beam spray head 12 is secured to the housing 14, via a flat plate 25. The spray head 12 includes an alignment housing 27, having a hollow chamber therein into which a pair of contact tubes 28 are disposed and suitably secured. The front cover 30 and annular arc nut 32 are secured to the alignment housing 27 and, together with the gun housing 14, substantially enclose the device. The inner recess of the annular arc nut 32 secures the nozzle positioner 36 and air cap 38 in the correct relative positioning within the spray head through a threaded joint. The nozzle positioner 36 abuts the support structure 25 near the rear of the spray head and is followed by the air cap 38 in a forward progression toward the open end 39 of the spray head 12. A plenum housing 40 having an annular recess 42 with a rectangular shape cross-section extends circumferentially around the arc nut 32 thus forming an annular gas duct 44 between the plenum housing 40 and a portion of the outer surface 46 of the arc nut 32. An annular groove 47 in the plenum housing 40 on either side of the duct 44 seats an O-ring 49 providing a gas-tight seal between the plenum housing and the arc nut 32. The plenum housing 40 further includes a port 48 for connection with a fitting 21 through which compressed gas is supplied. The port 48 extends inwardly opening into the gas duct 44.

The contact tubes 28 are disposed within the alignment housing 27 with approximately a 30 degree angle between them, although other angles are equally possible as will be appreciated. The contact tubes 28 terminate in contact tips 50 in the spray head 12 through which the wire ends 26 emerge and extend therefrom. The contact tubes 28 and contact tips 50 extend through angled cavities 52 in the nozzle positioner 36 and the inverted conical opening 54 in the air cap 38. The wire lengths 18 preferably extend to approximately the outer edge 56 of the air cap 38 where arcing between the wires occurs and a section of the end 26 of each wire 18 is consumed to form the coating material.

With reference now to FIGS. 3-7 in particular, the nozzle positioner 36 includes an axial passage 57 extending therethrough between the angled cavities 52 through which the contact tubes 28 and tips 50 extend. The axial passage 57 provides for the primary axial flow of gas through the spray head 12 along the axis A. The nozzle positioner 36 is provided with compressed gas through fitting 20 (FIG. 1) and suitable ducts (not shown) rearward of the nozzle positioner 36. Gas projected axially through the axial passage 57 of the nozzle positioner 36 proceeds into the inverted conical opening 54 in the air cap 38. As the axial gas flow along the axis A reaches the narrowest section 58 of the inverted cone 54, the compressed gas impinges directly on the arc created by the potential difference between the ends 26 of the wires 18 intersecting in this area. The molten metal formed at the arc is atomized by the axial gas stream and is propelled through a preferably divergent opening 59 of the air cap 38.

The inverted conical recess 54 and divergent opening 59 of the air cap 38 and a preferably divergent opening 60 of the arc nut 32 conjunctively effectuate a convergent-divergent nozzle action on flow of gas and atomized metal therethrough. Other configurations and relations of the openings 59 and 60 which impart desirable characteristics on the coaxial gas streams are possible and will be appreciated by those skilled in the art. For example, the divergent opening area 60 may be eliminated yet the nozzle head 12 will still provide results better than those achieved with conventional guns.

As mentioned above, the compressed gas for the secondary flow is provided through the port 48 in the plenum housing 40. As gas proceeds through the port 48 it enters the annular gas duct 44 which encompasses a section of the arc nut 32 having a number of evenly spaced through holes 62. Therefore, gas flowing through the duct 44 is evenly provided to the through holes 62 from where it passes through a number of notches 64 cut in the rear section of the air cap 38. Gases passing through the notches 64 enter the inverted conical recess 54 through a clearance provided between the rear of the air cap 38 and the front section 65 of the nozzle positioner 36 by the stepped outer surface 66 of the nozzle positioner 36. Preferably, opposing sides 68 of the nozzle positioner 36 are truncated to further increase the air flow through the slots 64 into the conical recess 54.

The general path through which the secondary gas flows into the conical recess 54 is illustrated by the coiled line 70 in FIG. 3. The secondary gas flow is evenly distributed around the conical recess 54 as it enters its rearmost section. The gas proceeds forward through the nozzle approximately conforming to the surface of the conical recess 54 and forming a conical sheath around the axial gas stream flowing along axis A and the wire ends 26 in the arc zone 24. Therefore, as the primary axial gas stream impinges upon the arc and resultant molten metal, it is surrounded by the secondary gas flow forming a coaxial stream The secondary gas flow is controlled separately of the primary axial gas flow, allowing for the correct adjustment between the two to achieve the properly directed spray. Further, the relatively open passageways and ducts through which the secondary gas flow passes allow for an adequate supply of gas to the nozzle, thus permitting the total gas flow through the spray head 12 to be substantially increased, such as to approximately twice that achieved in a conventional gun. The gas stream thus remains generally coaxial over a substantial portion of its path toward the surface to be coated.

Referring to FIG. 8, there is shown a pneumatic circuit 80 for providing and controlling the primary axial gas stream and secondary gas stream. A main gas supply hose 82 carries a common main gas supply for both the primary and secondary gas streams. The fitting 84 of the main supply hose 82 connects to a T branch 86 through a fitting 88. The T branch 86 separates the main supply flow into a portion representing the primary gas supply and a second portion representing the secondary gas supply. The T branch 86 provides the primary gas supply portion to the main console of the arc spray gun at 90. An adjustable air pressure regulator 91, having a pressure adjustment knob 91a, in the main console provides adjustment of the primary gas supply independent of the secondary gas supply. The regulated primary gas supply emerges from the main console at 92 and connects to a second T branch 94. The T branch 94 provides a small portion of the primary gas supply to an air pilot valve 95, which will be discussed below, through the pilot line 96 which is connecting to the T branch 94 through the fittings 98 and 100. The T branch 94 provides the remainder of the primary gas supply to the primary gas hose 20 through the attached fitting 102 and intermediate fitting 104. The primary gas supply hose 20 carries the gas supply to the alignment housing 27 through the fitting 106. The primary gas supply then flows through the nozzle 30 and air cap 38 to impinge upon the melted wire sections in the arc nut 32 and propel the molten metal through the gun as described above.

The secondary gas supply emerges from the T branch 86 and is carried through a hose 108 to the pilot air valve 95 through associated fittings 112 and 114. As stated above, the pilot air valve 95 is selectively provided with a pilot air supply through the pilot line 96 ball valve 115 and fitting 116. The ball valve 115 allows an operator to selectively open or close the pilot air supply to the pilot air valve 95. If the pressure of the primary gas supply and the pilot air supply is sufficient, e.g., when the ball valve 115 is open, the air pilot valve 95 will open allowing the secondary gas supply to reach the adjustable air regulator 118 through the nipple 120. If the pressure through the pilot line 96 drops below a predetermined valve e.g., when the ball valve 115 is closed, then the air pilot valve 95 will close thus shutting off the secondary gas stream.

The air adjustable pressure regulator 118 is connected to a pressure gauge 122 through the fittings 124 and 126. The pressure gauge 122 allows the user to accurately adjust the secondary gas stream to a desired value such as by turning the knob 123 of the adjustable air pressure regulator 118. The regulated secondary gas supply from the air pressure regulator 118 is provided to the annular plenum housing 40 through the hose 128 and fittings 130, 132. The secondary gas flow enters the annular gas duct 44 in the plenum housing 40 encompassing a section of the arc nut 32 and passes through the holes 62 and notches 64 to enter the inverted conical recess 54 and form the sheath around the primary axial gas flow.

The air pressure regulator 118 allows an operator of the arc spray gun to adjust the secondary flow forming the conical sheath around the primary gas stream independent of the regulation of the primary gas stream. By providing adjustment of the secondary gas stream the spray pattern, particle size, and deposit density can be varied for a fixed primary gas flow and the secondary gas stream can be tailored to varying primary gas flows through the gun. The independent adjustment of the primary and secondary gas streams also enables versatile operation of the gun and permits the use of supply wires having differing characteristics, such as thickness and composition. Further, the ball valve 115 and air pilot valve 95 allow the secondary gas stream selectively to be turned off so that the gun performs as a conventional spray gun or turned on to provide the adjustable narrow-beam features described herein.

The action of the coaxial gas stream when the spray gun is functioning in the arrow beam mode tends to constrain molten metal droplets along axis A, thus collimating and concentrating the molten metal spray. One advantage of the highly concentrated spray is that since it may be accurately focussed on a relatively small region, overspray and dust formation are reduced. This results in efficiency improvements in the spray head of the present invention providing an approximate 70% deposit efficiency compared to 57% or less for conventional spray guns. Evidence of these efficiencies are illustrated in FIG. 9 which is a graph of the spot thickness, amount of material that has been deposited upon a specific spot, as a function of the distance from the spot center, or the location where the beam was focussed. Point and plus symbols represent data taken from a conventional arc spray gun. The box and asterisk symbols represent data from an arc spray gun using the spray head of the present invention. As can be seen from the graph, the deposited coating material concentrated near the point of focus, as evidenced by the relatively sharp and high curves, is much greater with the present invention than with a conventional arc spray gun. The wider sloping curves for a conventional spray gun illustrates that the deposited material is distributed over a relatively wide area.

Further, since the gas flow, and particularly the gas velocity, through the nozzle is increased, the droplet size of the molten metal is reduced substantially. When these smaller droplets impact at the higher velocities upon the surface being sprayed, they "splat" forming smaller particles distributed over a smaller area, thus resulting in a visually smoother finish and a much finer microstructure of the coating than is possible in conventional spray guns.

The fact that the coating is smoother and more uniform means that to spray and machine a surface to a given coating thickness requires a thinner initial sprayed coating. This is because the smooth uniform coating applied with the narrow beam spray head of the present invention cleans up, machines to a smooth finish, much easier than with a conventional spray gun. This results in much less deposited material being removed from the coated surface than with a conventional gun.

In addition to the material saved by increasing the deposit efficiency, the reduction in droplet size can also result in materials saving. As an example, say that a 0.030 inch thick finished coating was desired on a surface. With a conventional arc spray gun an approximately 0.060 inch thick coating must be applied to the surface and then the last 0.030 inches of the coating would be machined away to achieve a smooth finished surface. With the narrow beam spray head of the present invention, it may be possible to cut the initial sprayed coating thickness down significantly from 0.060 inches thick to approximately 0.040–0.045 inches while still achieving the same 0.030 inch finished coating. The savings in the initial sprayed coating thickness results in material savings, and also possibly reduces machining time and costs.

The arc spray gun employing the narrow beam arc spray head of the present invention is operated in much the same way as a conventional spray gun. The only additional adjustment is the control of the secondary gas stream to the appropriate pressure and flow rate parameters to form the coaxial gas streams, if desired. In fact, due to the concentrated nature of the resultant spray, use of the gun in the narrow beam mode in practice is made somewhat simpler since the operator need not be as concerned with overspray and assuring thickness uniformity to the degree necessary when using a conventional spray gun.

What is claimed is:

1. A narrow beam arc spray head device, comprising:
   convergent-divergent nozzle means;
   a plurality of wires the paths of which intersect at a point in said nozzle means;
   means for supplying electrical current to said wires such that an arc is formed between said wires causing a portion of at least one of said wires to melt;
   a primary axial gas stream impinging upon such wire path intersection to cause such molten wire to be carried axially away from the area of such intersection; and
   a secondary gas stream forming a generally conical sheath around said axial gas stream in such convergent portion of said nozzle means;
   whereby said primary gas stream and said secondary gas stream emerge from said nozzle means as substantially coaxial gas streams thus tending to concentrate the flow of such molten wire carried by such substantially coaxial streams.

2. The device of claim 1, wherein said primary axial gas stream and said secondary gas stream are separately regulated.

3. The device of claim 1, wherein such coaxial streams remain coaxial substantially the complete distance to the surface to be sprayed.

4. The device of claim 1, wherein such point of intersection is at the general area of transition of the nozzle means from convergence to divergence.

5. The device of claim 1, wherein said primary gas stream atomizes such molten metal wire upon impinging such path intersection.

6. The device of claim 5, wherein the secondary stream tends to redirect such atomized particles which stray from such primary axial gas stream back towards such primary axial gas stream.

7. The device of claim 1, wherein said primary axial gas stream is air.

8. The device of claim 1, wherein said secondary gas stream is air.

9. An arc spray gun device, comprising:
   convergent nozzle means;
   means for forming an arc within said nozzle means for melting a material intended to be sprayed on a surface;
   first propellant means for propelling said molten material through said nozzle in an axial direction;
   second propellant means for forming a sheath around such molten material coaxial with such axial direction substantially the complete distance to the surface; and
   regulator means for regulating said second propellant means relative to said first propellant means;
   wherein said first and second propellant means are supplied from a common source.

10. The device of claim 9, further including a pilot valve for shutting off said second propellant means while the pressure of said first propellant means is below a predetermined value.

11. The device of claim 9, wherein said first propellant means is an axial gas stream.

12. The device of claim 11, wherein said second propellant means is a gas stream.

13. The device of claim 12, wherein said gas streams are air.

* * * * *